United States Patent [19]
Wilding et al.

[11] 4,348,148
[45] Sep. 7, 1982

[54] DUMPER APPARATUS AND METHODS

[75] Inventors: Edwin Wilding, Louisville; James W. DeVere, Jeffersontown, both of Ky.

[73] Assignee: Griffin & Company, Inc., Louisville, Ky.

[21] Appl. No.: 61,748

[22] Filed: Jul. 30, 1979

[51] Int. Cl.³ .............................................. B65B 21/02
[52] U.S. Cl. .................................... 414/421; 248/128
[58] Field of Search ............... 414/421, 403, 409, 425

[56] References Cited

U.S. PATENT DOCUMENTS

| | | | |
|---|---|---|---|
| 720,681 | 2/1903 | Derrig | 248/128 |
| 1,733,195 | 10/1929 | Johnson | 188/69 |
| 1,973,767 | 9/1934 | Kimball et al. | 414/414 |
| 2,413,900 | 1/1947 | Abbot | 414/421 |
| 2,974,752 | 3/1961 | Howard | 188/69 |
| 3,225,947 | 12/1965 | Anderson | 414/421 |
| 3,662,910 | 5/1972 | Herpich et al. | 414/406 |
| 3,884,376 | 5/1975 | Rivers | 414/421 |
| 4,084,852 | 4/1978 | Prosek et al. | 298/22 C |

Primary Examiner—Trygve M. Blix
Assistant Examiner—R. B. Johnson
Attorney, Agent, or Firm—Wood, Herron & Evans

[57] ABSTRACT

An improved tobacco dumper is provided with a brake means for safely holding the dumper in a raised position blocking the hood opening of a tobacco feeder. Control apparatus prevents brake engagement until the dumper is in an upper dump position, and prevents dumper return until a specific control input is received and the brake is positively disengaged. Apertured drive sprockets and aligned brake pins are utilized.

3 Claims, 13 Drawing Figures

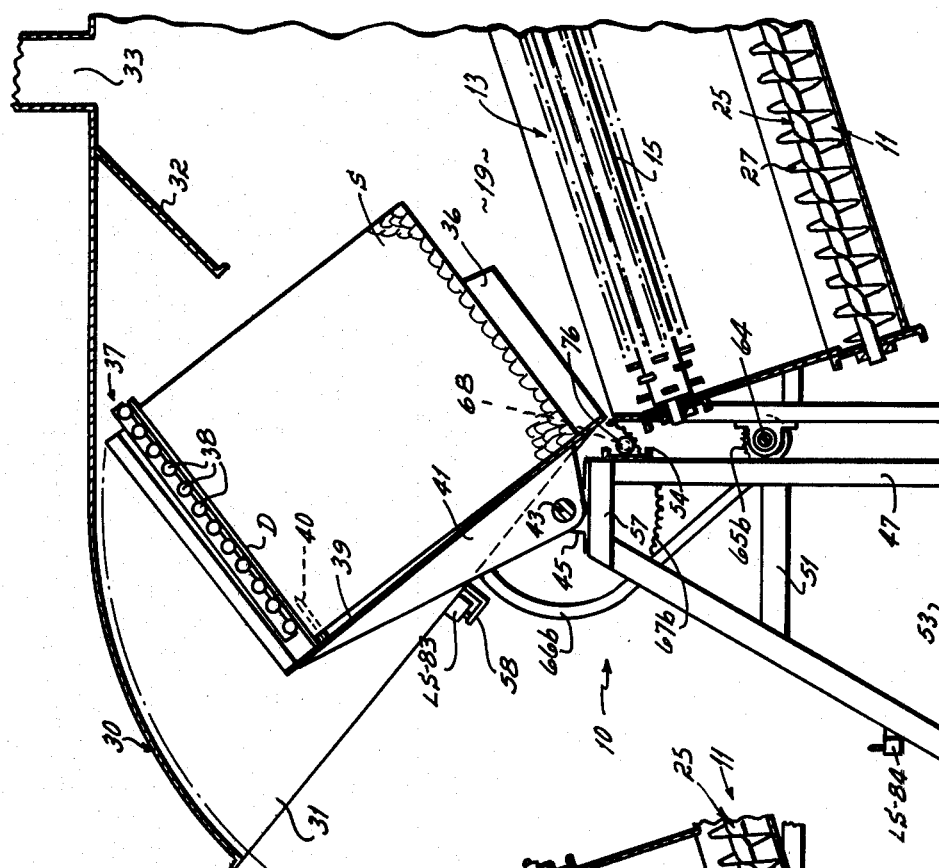
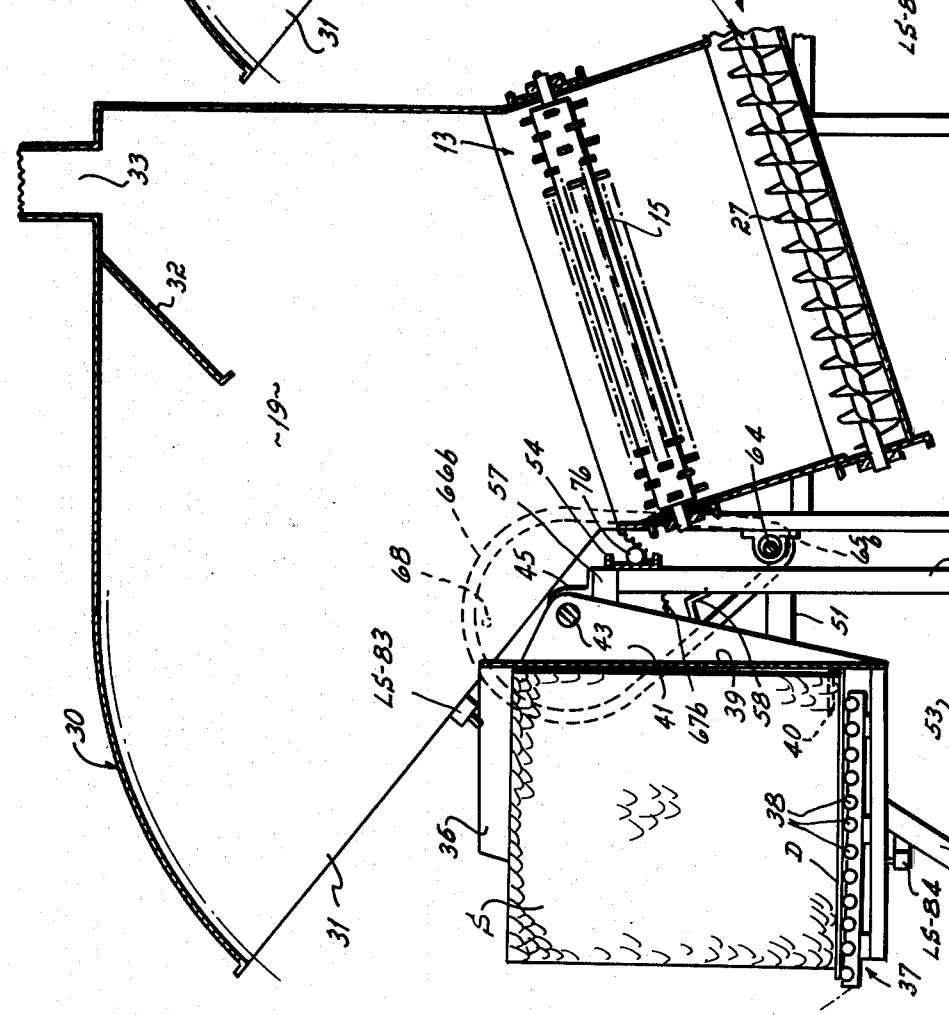

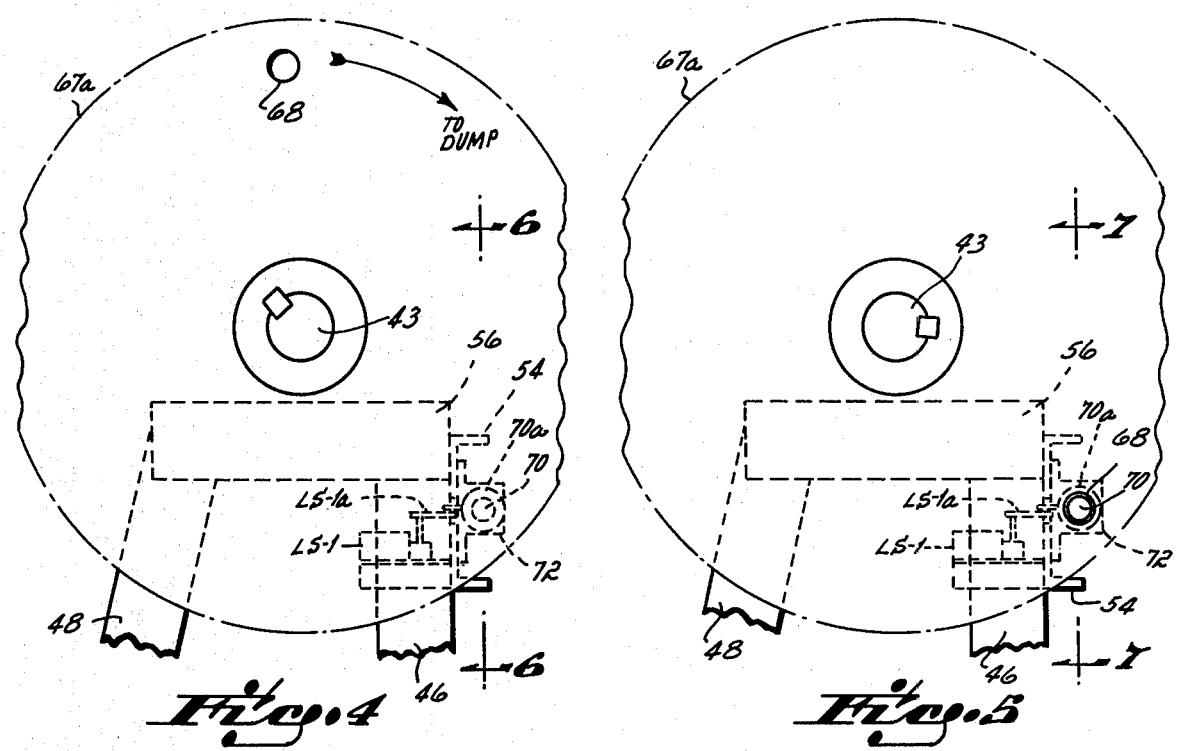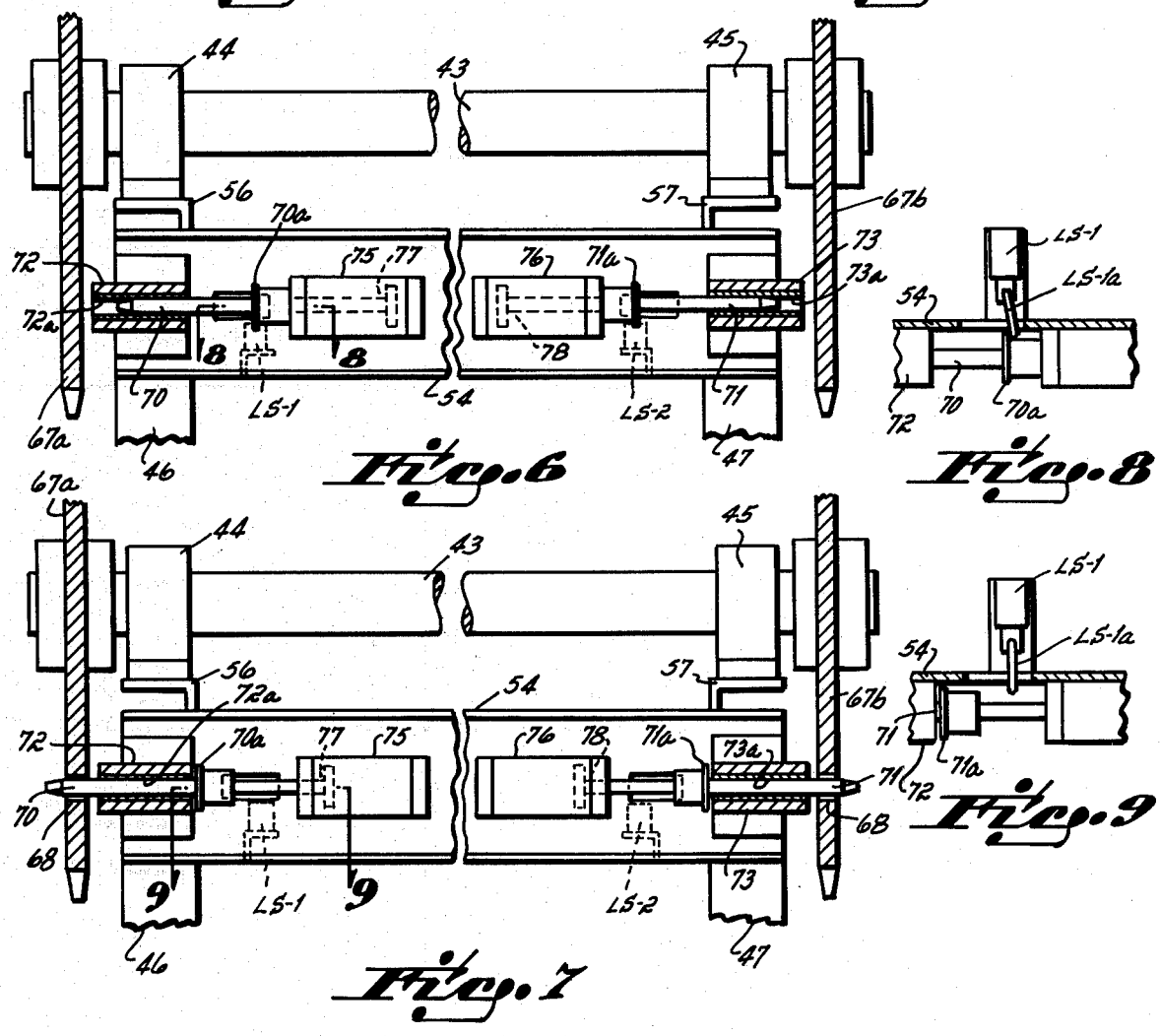

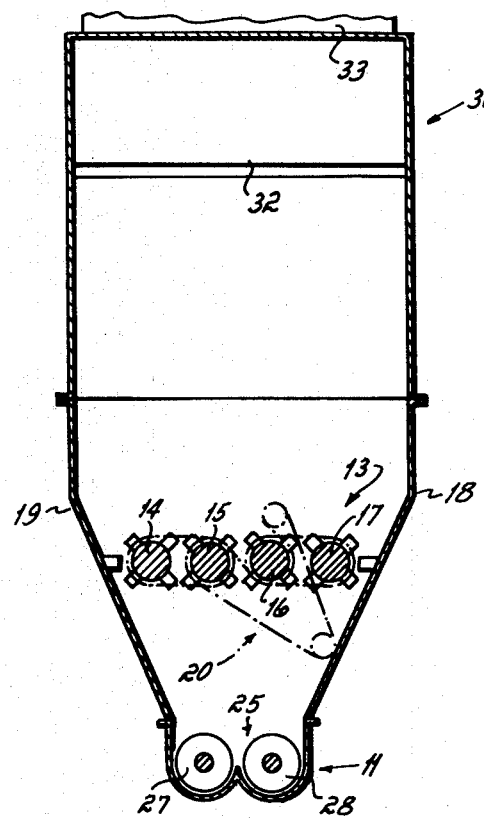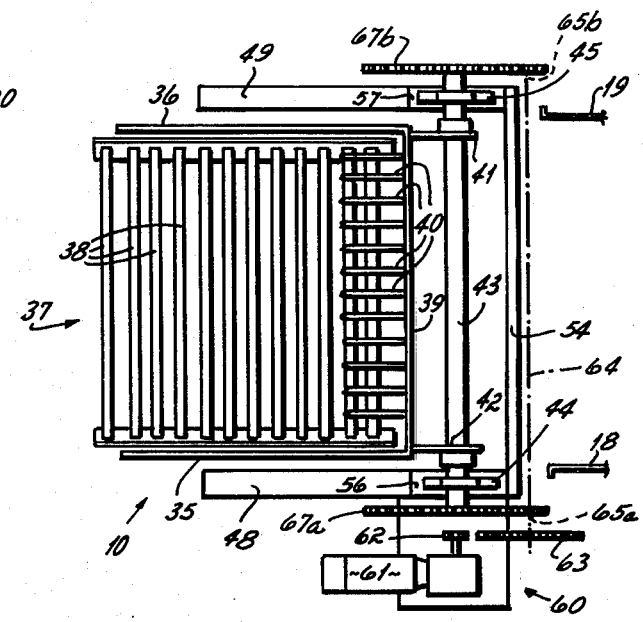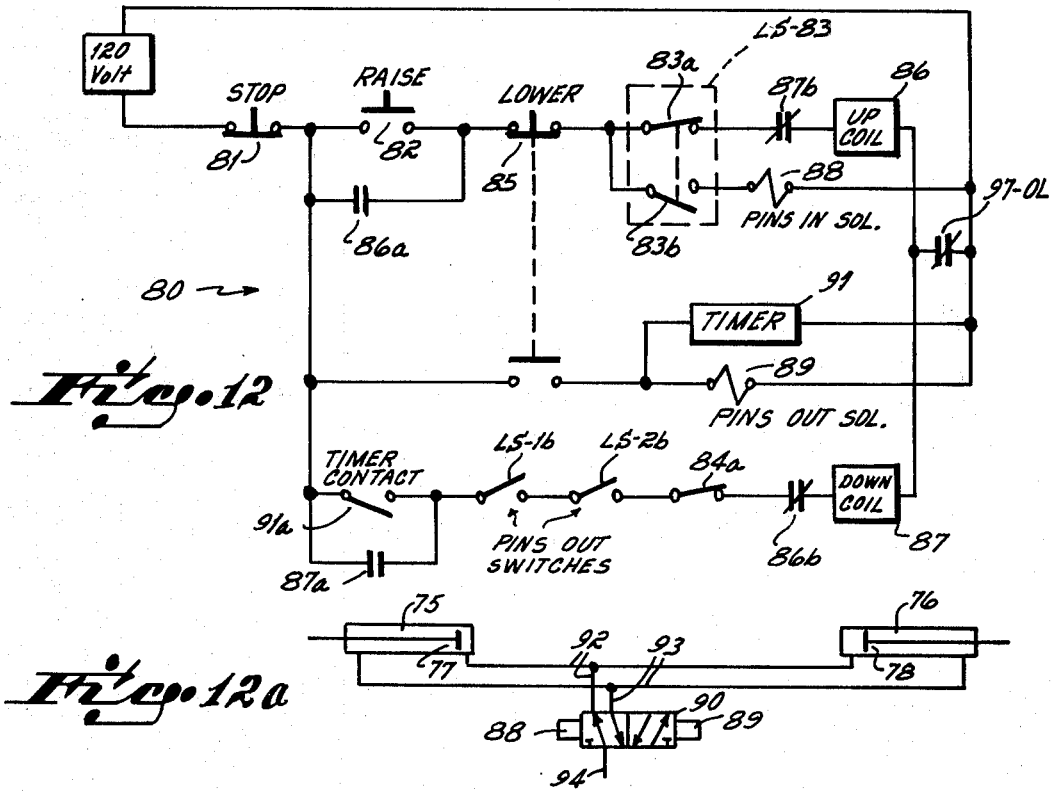

DUMPER APPARATUS AND METHODS

This invention relates to dumper apparatus and methods and more particularly to apparatus and methods for dumping hogsheads of tobacco into feeder apparatus.

In the handling and processing of tobacco it is known to dump hogsheads of tobacco into a tobacco feeder, for example, which separates the tobacco and conveys it to processing equipment. Such feeders may include rotating doffers which agitate the tobacco and drop it into a screw conveyor, for example, for transmission to further processing.

Many such feeders are enclosed, such as by means of a hood, both for safety reasons and to prevent introduction of foreign matter to the tobacco. In a typical feeder, the hood is provided with an end opening proximate and above the doffers, and the dumper is raised to dump tobacco from the dumper onto the doffers through this opening.

Hogsheads of tobacco are heavy, weighing in the approximate range of from about 800 pounds to about 1,000 pounds, for example, and require relatively heavy, sturdy equipment to lift them for dumping. When a pivoting dumper as has been used in the past is concerned, it is pivoted into the opening for dumping and is then lowered for receiving a further load. When the dumper is in its raised, dumping position, it constitutes a hazard, due to its necessary size and mass. If unintentionally lowered or dropped, it could cause severe injury to nearby personnel or damage to the equipment. Thus it is desirable to provide safe dumping apparatus for handling the dumper when it is in its raised position.

The doffers of the feeding apparatus also present a potential safety hazard even though they are substantially closed by a hood. Normally the doffers include rotating peripheral projections which would injure someone who might unwisely locate himself near the doffers. To totally enclose the doffer area, it would be necessary to close off or block the dumper opening in the hood. Such blocking is desirable at least during the longest time periods possible in order to prevent someone from climbing or falling into the hooded area. While the dumper blocks the hood opening when raised, as explained, it has heretofore been unsafe to leave it in that position due to its large size and mass.

Accordingly, it has been one objective of this invention to provide improved dumping apparatus and methods.

It has been a further objective of this invention to provide braking apparatus for safely holding a dumper in a raised position.

A further objective of the invention has been to provide improved control apparatus for a dumper brake and drive.

A further objective of the invention has been to provide improved methods for dumping tobacco.

A further objective of the invention has been to provide a dumper brake means and means to ensure the brake means will not engage prior to the dumper's reaching its uppermost position, and to ensure the dumper will not be driven downwardly until the brake is intentionally and positively released.

A further objective of the invention has been to provide an improved tobacco dumper and dumper brake means and a control therefor.

To these ends, a preferred embodiment of the invention includes a dumper brake for a tobacco feeder dumper including dumper drive sprockets on each side of a dumper, a brake aperture in each of the sprockets, a brake pin mounted proximate each of the sprockets, and apparatus for inserting the pins into the apertures which align with the pins when the dumper is raised. The pins safely hold the dumper in its raised position, blocking the opening in the hood.

Moreover, control means are provided for ensuring that the pins are not driven into the sprocket until the dumper has reached its raised position, and that the dumper drive to lower the dumper is not actuated until the pins are positively withdrawn from the sprocket. This is accomplished in part by upper limit switch means for controlling the pin drive to engage and, according to the invention, a drive control for lowering the dumper which operates only in response to both the expiration of a predetermined time delay and to the actual withdrawal of the brake pins from the sprockets.

In this manner, the dumper itself can be safely used to close off the hood opening and the brake means cannot be inadvertently engaged, nor can the brake means be disengaged, except upon the generation of an intentional control input to lower the dumper, and the dumper drive cannot be started to lower the dumper until the brake has positively been disengaged, all of which promotes safe operation of the equipment both with respect to personal injury and with respect to equipment damage which might otherwise be caused by unskilled use of the equipment.

These and other objects and advantages will be even more readily appreciated from the following description of a preferred embodiment of the invention, and from the drawings in which:

FIG. 2 is a cross-sectional view similar to FIG. 1 but with portions of the feeder and dumper drive removed for clarity and showing the dumper in a first or lowered position for receiving a hogshead of tobacco;

FIG. 3 is a cross-sectional view similar to FIG. 2 but showing the dumper in a raised or dumping position for dumping tobacco into a feeder;

FIG. 4 is an illustrative view of one dumper drive sprocket in a position corresponding to the first or lowered position of the dumper;

FIG. 5 is a view similar to FIG. 4 but showing the sprocket in a position corresponding to the raised or dump position of the dumper;

FIG. 6 is a cross-sectional view taken along lines 6—6 of FIG. 4;

FIG. 7 is a cross-sectional view taken along lines 7—7 of FIG. 5;

FIG. 8 is a cross-sectional view taken along lines 8—8 of a FIG. 6;

FIG. 9 is a cross-sectional view taken along lines 9—9 of FIG. 7;

FIG. 10 is a cross-sectional view taken along lines 10—10 of FIG. 1;

FIG. 11 is a cross-sectional view taken along lines 11—11 of FIG. 1; and

FIGS. 12 and 12a are diagrammatic views of the control circuit means for the invention.

Figure 1:
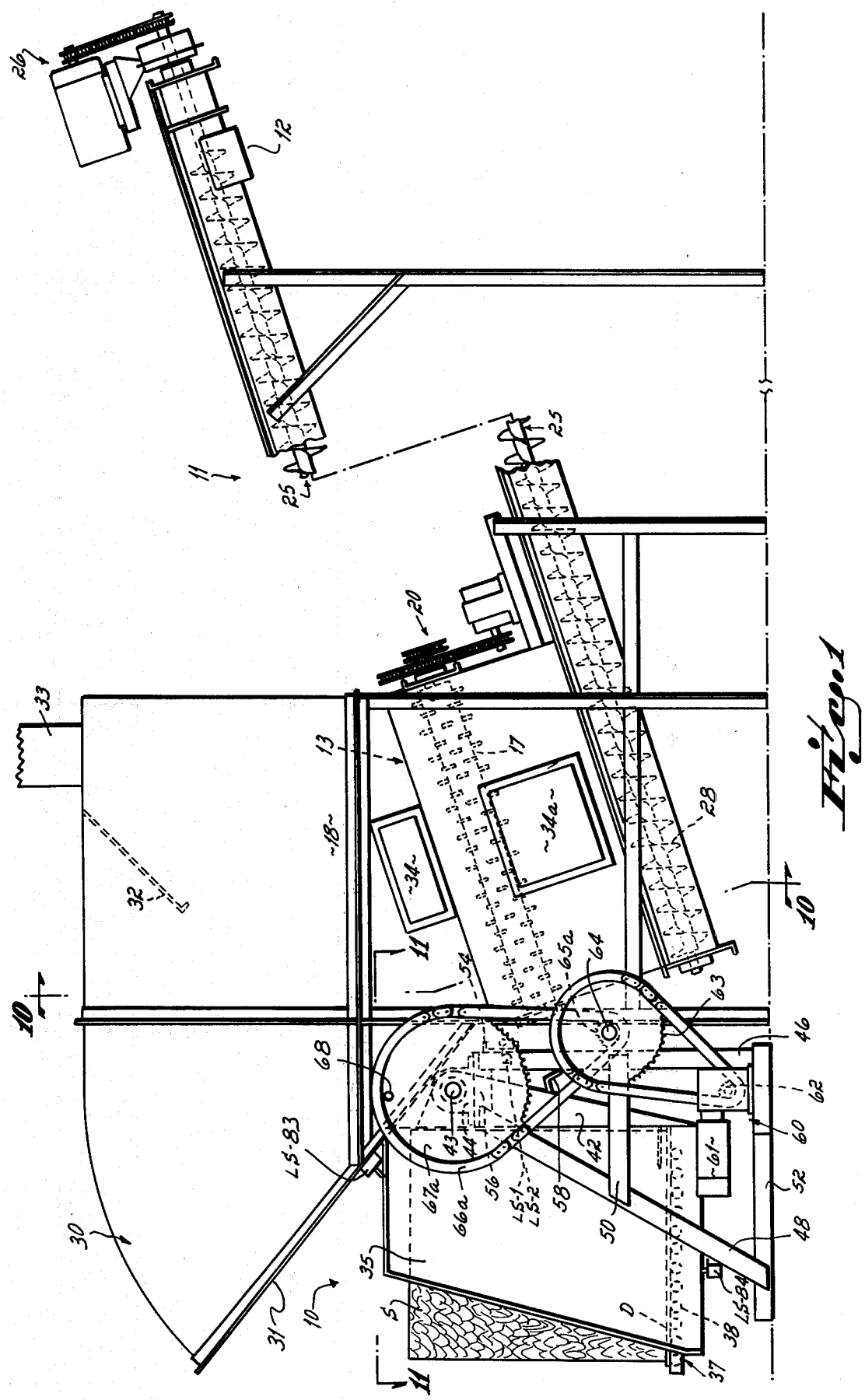
FIG. 1 is an elevational view of the invention in conjunction with a tobacco feeder.

Turning now to the drawings, there is shown in FIG. 1 a dumper apparatus 10 according to the invention and shown in operative relationship with a feeder apparatus 11. Apparatus 11 is a feeder of the type particularly adapted for receiving a hogshead of tobacco from the dumper apparatus 10 and for feeding the tobacco to a discharge end 12 of the feeder apparatus for conveyance to further processing equipment. To provide an understanding of the invention, a short description of the feeder apparatus is appropriate.

The Feeder Apparatus

The feeder apparatus 11 includes a doffer means 13 which is shown in FIGS. 1 and 10 to comprise a set of four rotating doffers 14, 15, 16 and 17 disposed within a housing having sides 18 and 19. The doffers 14-17 are driven through a drive means 20 as diagrammatically illustrated in FIG. 1.

The doffer means 13 are located above a screw conveyor means 25 located at the bottom of the elongated funnel housing provided by sides 18 and 19 of the feeder 11. The screw conveyor 25 is disposed, as shown in FIG. 1, on an incline and the screw conveyor is rotatable to convey tobacco, which is dropped thereon by the doffer means 13, upwardly to a discharge end 12 of the feeder apparatus where the tobacco is discharged to further equipment for processing. A drive means 26 is provided at the upper end of the screw conveyor means 25 for rotating the helixes 27 and 28 of the screw conveyor 25.

The feeder apparatus 11 further includes a hood means 30 which is disposed proximate to and above the doffer means 13. As will be appreciated from FIGS. 1-3 and 10, the hood means 30, together with the sides 18 and 19, substantially surrounds the lower end of the screw conveyor 25 and the doffer means 30.

The hood 30 is provided with an opening 31 for receiving tobacco to be dumped onto the doffer means 13. Moreover, the hood means 30 is provided with a plate 32 which extends across the hood means 30 and acts as a deflector for any tobacco directed thereon from the dumping operation. Finally, the hood 30 is provided with a vent 33 for venting the chamber provided by the hood and the sides 18 and 19.

If desired, windows 34 and 34a may be placed in the side 18 so that the dumping, doffing and screw conveying operation at that area of the feeder apparatus can be observed.

The Dumper

The dumper 10 is located as shown in the drawings proximate the lower end of the feeder apparatus 11 and the opening 31 in the hood 30. The dumper 10 includes an open hopper having sides 35 and 36, a bottom 37 including a plurality of rollers 38 and a rear end wall member 39. At a lower end of the rear end wall, a plurality of pins 40 extend forwardly of the wall 39.

The rear end wall 39 of the dumper is secured to elongated mounting brackets 41 and 42 and these are positively secured by keying, for example, to a driven shaft 43. Drive shaft 43 is rotatably mounted in pillow blocks 44 and 45 which are supported on a frame means preferably comprising among other parts, legs 46 and 47, inclined legs 48 and 49, cross pieces 50 and 51, and bottom members 52 and 53. Further, the frame comprises cross members at the bottom thereof (not shown), top pieces 56 and 57 supporting pillow blocks 44 and 45, and cross piece 54 extending between the legs 46 and 47 as will be further described.

A dumper drive means 60 is mounted on the frame and includes a gear motor 61 of any suitable type. Preferably, the motor comprises a brake motor of the type having an electrically operated mechanical brake engaged when the current to the motor is interrupted. This contributes to the safety of the apparatus. Gear motor 61 has an output sprocket 62 connected to an intermediate drive sprocket 63 mounted on a jackshaft 64. Jackshaft 64 is connected to two intermediate drive sprockets 65a and 65b which are connected by a flexible chain means 66a and 66b respectively to drive sprockets 67a and 67b. Each of these is provided with a brake aperture as will be described. From FIG. 11, it will be appreciated that the intermediate drive sprocket 63 is located at one end of the drive shaft 64 and that there are two intermediate sprockets 65a and 65b located near the ends of the jackshaft 64. Each of the intermediate sprockets 65a and 65b is connected to a respective drive sprocket 67a and 67b mounted on opposite ends of the drive shaft 43.

Thus, it will be appreciated that as gear motor 61 is operated, the sprocket 62 drives a chain which in turn drives the intermediate drive sprocket 63. Rotation of the drive sprockets 63 rotates the shaft 64 driving the sprockets 65a and 65b, the chains 66a and 66b and the drive sprockets 67a and 67b, respectively.

It will further be appreciated that the gear motor 61 is a bi-directional gear motor. Thus, the drive means 60 can be operated in one direction to raise the dumper from a lowered or first position which is shown in FIGS. 1 and 2, for example, to a raised or dump position as shown in FIG. 3. In another direction of operation, the drive means 60 is operable to lower the dumper from the raised or upper position as shown in FIG. 3 back to the lowered position, for example, as shown in FIG. 1. Any suitable reversible gear motor can be used.

Brake Means

The braking means of the present invention is perhaps best seen in FIGS. 4-7. Turning to FIG. 6, it will be seen that the brake means includes two pins 70 and 71 slidably mounted within respective guide tubes 72 and 73 which may be provided with wear sleeves 72a and 73a. Guide tubes 72 and 73 are respectively mounted on the cross piece 54 adjacent the legs 46 and 47 as shown such that the guide tubes and pins are mounted proximate the respective sprockets 67a and 67b. The pins 70 and 71 are respectively mounted for extension and retraction into the apertures 68 of the respective sprockets by means of fluid cylinders 75 and 76, for example. Of course, it may be possible to use a single fluid cylinder or to use electronic solenoid means or any other suitable apparatus for projecting the pins into and withdrawing them from the apertures 68. Each of the cylinders is provided with a respective piston 77 and 78 and each of the cylinders is double acting so as to extend or to positively retract the pistons and thus the pins.

Also mounted on the cross piece and proximate the pins 70 and 71 are limit switches LS-1 and LS-2. The limit switches have switch arms LS-1a and LS-2a which are mounted proximate the respective flanges 70a and 71a of the pins 70 and 71 in a position so that the arms of the limit switches can be engaged by these flanges as will be described. Thus in FIG. 8, limit switch arm LS-1a is engaged by flange 70a to close the limit switch contacts LS-1b (FIG. 12). This corresponds to a position in which the pin 70 is withdrawn from the aperture 68 in sprocket 67a. In FIG. 9, the piston 77 has been extended and the flange 70a is moved from the arm LS-1a so that the contacts LS-1b (FIG. 12) of the LS-1 switch are opened. The switches LS-1 and LS-2 operate in the same manner with respect to their respective pins whose movement they monitor.

Control

A control means in accordance with the invention is diagrammatically shown in FIGS. 12 and 12a. The control means 80 is connected to a source of electrical energy such as 120 volts. It further includes a stop switch 81 for emergency purposes, and a start switch 82 for raising the dumper.

The control further includes contacts 83a and 83b of an upper limit switch LS-83 which is mounted in a position near the opening 31 of the hood as shown in the figures. A down limit switch LS-84 has contacts 84a in the control circuit of FIG. 12. The down limit switch LS-84 is located on the dumper leg 49, for example, as shown in FIG. 2 proximate a lower end of the dumper when it is in its down or first position.

The control circuit of FIG. 12 further includes a start switch 85 for lowering the dumper. The start switch 85 has contacts 85a and 85b in the circuit diagram as shown.

Preferably, where a bi-directional gear motor is used having specific circuitry for reversing the direction of operation of the motor, an up coil 86 for the gear motor is connected in the circuitry as shown and a down coil 87 for the gear motor is also connected as shown. A circuit, upon appropriate operation, is selectively made through these coils and contacts 97-OL which are conventional contacts of overload coils normally supplied with the starters for motors such as motor 61. These contacts are normally closed, but open upon motor overload, for example, to stop and thus brake the motor, which holds the dumper in its position.

It will be appreciated that the gear motor 61 is wired so that upon energization of the up coil 86, the gear motor rotates in one direction to raise the dumper. Upon energization of the down coil 87, the gear motor rotates in the opposite direction to lower the dumper.

The control circuitry further includes two solenoids 88 and 89 for controlling a pneumatic or hydraulic valve 90 (FIG. 12a) which actuates the fluid cylinders 75 and 76. These solenoids are depicted in FIG. 12 diagrammatically, and are shown in FIG. 12a mechanically connected to valve 90 which is selectively operable by each of the solenoids upon energization of the solenoids as in a manner as will be described.

Returning to FIG. 12, a timer 91 is connected as shown and has contacts 91a which are normally open but can be closed momentarily upon operation and timing out of the timer. Contacts LS-1b and LS-2b are also connected in series with the timer contact 91a as shown. These contacts are closed only when the pins have been withdrawn from the aperture 68 in the sprocket 67, such as when they are in the position as shown in FIG. 8 of the drawings.

Operation

The operation of the dumper and the control means as shown in FIGS. 12 and 12a will now be described in connection with the dumping of hogsheads of tobacco. While the present invention is illustrated as handling hogsheads where the sides of the container have been stripped off and pins 40 stick into the tobacco, the dumper according to the invention is adaptable to handle full hogsheads which have not been stripped, boxes and other containers of material.

First, a hogshead of tobacco is located on the dumper. In this connection, it will be appreciated that a hogshead of tobacco constitutes a container of tobacco having the dimensions of approximately 3½ feet in diameter and being approximately 4 feet high. Such a hogshead has a head D in the form of a disc and cylindrical sides which may be stripped or removed from around the tobacco leaving only a bottom disc D on the rollers supporting the total load of tobacco which remains formed due to the nature of the tobacco material. It will be appreciated that one edge of the disc D extends under the pins 40 and the pins simply stick into the side of the tobacco at the bottom of the tobacco stack. Such a formed stack S of tobacco is shown in FIG. 1.

When it is desired to dump the tobacco on the dumper 10 into the doffer means 13, the switch 82 (FIG. 12) is closed. At this point in time, the contact 85a of the start switch 85 is normally closed and the contact 83a of the upper limit switch LS-83 is normally closed. Also, the normally closed contact 87b of the down coil 87 is closed. Thus, the closing of the switch 82 completes a circuit through the up coil 86 and the motor is energized to drive the sprocket and chain means as has been described to raise the dumper from the position shown in FIG. 2 to its position shown in FIG. 3.

As the dumper moves into the position shown in FIG. 3, an element 58, which is mounted on the dumper structure, engages the switch LS-83. Engagement of the limit switch LS-83 opens the contact 83a and closes the contact 83b. The closing of the contact 83b energizes a "pins in" solenoid 88.

Also, referring now to FIG. 12a, the pins in solenoid 88 is operable to move the valve 90 to its position as shown in FIG. 12a wherein compressed air or hydraulic fluid from a pressurized fluid supply 94 is conveyed through a fluid line 92 to the cylinders 75 and 76 for extending the pistons 77 and 78. At this time, the position of the valve 90 also serves to vent the line 93 permitting this operation of the cylinders 75 and 76. Of course, it will be appreciated that the aperture 68 in the sprockets 67a and 67b are positioned with respect to those sprockets, and the angular position of the drive shaft 43, such that when the dumper reaches its uppermost position as shown in FIG. 3, the apertures 68 are respectively aligned with the pins 70 and 71. Thus, the pins can be extended into the apertures as shown in FIG. 7 for example.

At this point it will be appreciated that even though the normally open contacts 86a of the up coil 86 have closed around the switch 82 as a result of energization of the up coil 86 (and in order to maintain the circuit even though switch 82 is manually released), the opening of the contacts 83a by the upper limit switch has de-energized the up coil 86 to interrupt current to stop the drive motor and thus to brake the motor and dumper in its upper position. At the same time, the closing of the contacts 83b have actuated the pins in solenoids to control the pins to be driven into the sprockets to safely lock the sprocket. Thus, even if the chains should break, or a sprocket slip, the dumper would still be safely held in its upper position.

The pins and their mounting guides 72 and 73 are selected so that they provide substantial braking for the sprockets 67a and 67b and are thus operable to hold the dumper 10 in its position as shown in FIG. 3. In this connection, it will be appreciated that the rear wall 39 of the dumper, together with the bottom of the dumper including the conveyor rollers 38, provides a substantial blockage of the opening 31 in the hood 30 and it is not possible for anyone to climb or fall into or through the opening 31 into the area of the apparatus housing the doffers 13.

Engagement of the pins in the sprockets positively holds the dumper in the upright condition as shown in FIG. 3. This positive engagement insures the positive locking of the raised dumper in that position and, while the mass of the dumper may be relatively balanced in this position, these pins insure that the dumper will not fall forwardly or rearwardly until they are intentionally withdrawn. This substantially improves the safety of any personnel who may be in the vicinity of the dumper for cleaning, for example.

Moreover, it will be appreciated that any tobacco traveling forwardly of the dumper is deflected by the deflector means 32. Thus in this position, the tobacco falls off the dumper and onto the doffer means 13 where the tobacco material is separated by the doffer means 13 and falls onto the screw conveyor 25 for conveying to further processing.

The dumper can only be lowered by means of an intentional control input into the control means shown in FIG. 12. In this regard and in order to lower the dumper, the start switch 85 is depressed, opening the contacts 85a and closing the contacts 85b. It will be appreciated, however, that the down coil 87 is not immediately energized. Rather, the closing of the contacts 85b serves to energize the timer 91 which now begins to time out over a predetermined period. As well, closing of contacts 85b serves to energize the "pins out" solenoid 89. When the pins out solenoid 89 is energized, and referring to FIG. 12a, the valve 90 is moved to a different position venting line 92 and conducting the pressurized fluid through line 93 to the forward ends of the respective cylinders 75 and 76. This action withdraws the pistons 77 and 78 into the respective cylinders and thus withdraws the pins 70 and 71 to the position shown in FIG. 6, out of the apertures 68 in the sprockets 67a and 67b.

When the pins are withdrawn from the sprocket, the flanges 70a and 71a engage the switch arms LS-1a and LS-2a to close the switches LS-1 and LS-2. Closing of these switches closes the contacts LS-1b and LS-2b as shown in FIG. 12. Once the timer 91 times out, the timer contact 91a momentarily closes. Since the contacts 84a of the down limit switch LS-84 are normally closed, unless that switch is operated, and since the contacts 86b of the up coil 86 are normally closed, the down coil 87 can now be energized.

It will be appreciated, however, that the down coil 87 is only energized when: (a) both the pins have been retracted from the sprockets so as to close the contacts LS-1b and LS-2b, and (b) when the timer contact 91a is closed. Thus, the control insures that the gear motor will not be started to drive the dumper to its lower position until an intentional control input to lower the dumper has been given and until the pins have been withdrawn from the sprockets. The timer 91 is provided in order to provide a delay so that the withdrawing of the pins can take place. Of course, upon energization of this circuit to energize the down coil 87, the contacts 87a of the down coil are closed around the timer contact 91a to maintain energization of the down coil 87 until such time as the dumper engages the down limit switch LS-84. At this point, the contact 84a is opened, cutting off the source of electrical supply to the down coil 87 and the gear motor stops.

Accordingly, it will be appreciated that the invention provides a number of improvements over the prior dumper apparatus. First, the braking means of the invention insures that the dumper can be held in its upper position blocking off the opening 31 of the feeder apparatus hood. The positive engagement of the pins with the drive sprockets insures that the dumper will not be moved forwardly or rearwardly of its raised position so as to injure persons or equipment in the area. Moreover, it will be appreciated that the control means insures that the brake will not engage until the dumper is in its appropriate uppermost position.

It will also be appreciated that the control provides a specific safety factor in that the dumper cannot be lowered until a positive control input is made. Specifically, the dumper cannot be lowered until the down start button is pushed, until the brake pins have actually been withdrawn from the drive sprockets, and until the delay timer times out permitting the pins sufficient time to have been withdrawn. Thus, the potential damage to equipment due to premature operation of the dumper before the brake means is disengaged is prevented.

These and other advantages and modifications will be apparent to those of ordinary skill in the art without departing from the scope of this invention and the applicants intend to be bound only by the claims appended hereto.

We claim:
1. Apparatus for dumping tobacco into a feeder apparatus having a hood with an opening for receiving tobacco, said apparatus including a pivoted dumper supporting a load of tobacco and being pivotable from a first position for receiving tobacco to a raised position within said opening for dumping tobacco, the improvement comprising,
   means for holding said dumper in said raised position within said opening,
   said means including a first element pivoting with said dumper from said first position to said raised position, and
   a selectively actuable blocking element movable to a blocking position with respect to said first element when said dumper is in its raised position,
   wherein said first element comprises a dumper drive sprocket having a central pivot axis and having an aperture therein spaced from said axis, and wherein said blocking element includes a movable brake pin, said aperture being operatively aligned with said brake pin when said dumper is in its raised position and said brake pin being movable into said aperture when said dumper is in its raised position for locking said dumper in its raised position, and
   further including two drive sprockets, each having a central axis, and an aperture therein spaced from said axis, and further including two movable brake pins, each operatively associated with a respective drive sprocket, said apertures being operatively aligned with respective ones of said pins when said dumper is in its raised position, said brake pins being movable into respective ones of said apertures when said dumper is in its raised position for locking said dumper in its raised position.

2. Apparatus for dumping tobacco into a feeder apparatus having a hood with an opening for receiving tobacco, said apparatus including a pivoted dumper supporting a load of tobacco and being pivotable from a first position for receiving tobacco to a raised position within said opening for dumping tobacco into said feeder apparatus, the improvement comprising:

a first element pivoting with said dumper from said first position to said raised position, said first element comprising a dumper drive sprocket having a central pivot axis and having an aperture therein spaced from said axis, a selectively actuable blocking element movable to a blocking position with respect to said first element when said dumper is in its raised position, said blocking element including a movable brake pin operatively aligned with said aperture when said dumper is in its raised position, said brake pin being movable into said aperture when said dumper is in its raised position for locking said dumper in its raised position, means to drive said sprocket for raising said dumper to its raised position and for lowering said dumper to its first position, means to move said pin into and out of said aperture, control means for controlling said drive means to raise and lower said dumper, and for controlling said pin moving means to engage said pin in said aperture, and said control means including apparatus for delaying movement of said dumper from its raised to its first position to prevent lowering said dumper until said pin is retracted from said aperture.

3. Apparatus for dumping tobacco into a feeder apparatus having a hood with an opening for receiving tobacco, said apparatus including a pivoted dumper supporting a load of tobacco and being pivotable from a first position for receiving tobacco to a raised position within said opening for dumping tobacco into said feeder apparatus, the improvement comprising:

two drive sprockets pivoting with said dumper from said first position to said raised position, each of said two drive sprockets having a central axis, and an aperture therein spaced from said axis, selectively actuable blocking elements, including two movable brake pins, each operatively associated with a respective drive sprocket, said respective apertures being operatively aligned with respective ones of said pins when said dumper is in its raised position, said brake pins being movable into respective ones of said apertures when said dumper is in its raised position for locking said dumper in its raised position, a dumper drive shaft disposed along the central axis of said sprockets, said sprockets being connected thereto at respective ends of said drive shaft, frame means supporting said drive shaft, including a cross-tie element extending across said frame means between said sprockets, at least one fluid cylinder for driving said brake pins, said cylinders mounted on said cross-tie element, and, guide means respectively mounted on said cross-tie between said cylinder and each of said sprockets for slidably holding and guiding respective brake pins.

* * * * *